United States Patent [19]

Beson

[11] Patent Number: 5,494,256

[45] Date of Patent: * Feb. 27, 1996

[54] DUAL SEAL BALL VALVE

[76] Inventor: John Beson, 10938 Leaning Ash, Houston, Tex. 77079

[ * ] Notice: The portion of the term of this patent subsequent to Aug. 16, 2011, has been disclaimed.

[21] Appl. No.: 284,909

[22] Filed: Aug. 2, 1994

Related U.S. Application Data

[63] Continuation of Ser. No. 889,792, May 28, 1992, Pat. No. 5,338,003, and a continuation-in-part of Ser. No. 758,018, Sep. 12, 1991, abandoned, which is a continuation-in-part of Ser. No. 504,512, Apr. 4, 1990, abandoned, which is a continuation-in-part of Ser. No. 493,045, Mar. 12, 1990, abandoned, which is a continuation of Ser. No. 343,474, Apr. 26, 1989, abandoned, which is a continuation of Ser. No. 189,574, May 3, 1988, abandoned, which is a continuation of Ser. No. 49,231, May 13, 1987, abandoned, which is a continuation of Ser. No. 659,614, Oct. 11, 1984, abandoned, which is a continuation-in-part of Ser. No. 551,589, Nov. 14, 1983, Pat. No. 4,566,671, said Ser. No. 889,792 is a continuation-in-part of Ser. No. 798,448, Nov. 26, 1991, Pat. No. 5,320,327, which is a continuation of Ser. No. 685,219, Apr. 12, 1991, abandoned, which is a continuation of Ser. No. 493,045, abandoned.

[51] Int. Cl.$^6$ .............................. F16K 5/06; F16K 5/20
[52] U.S. Cl. ............................................ 251/172; 251/174
[58] Field of Search ................................. 251/172, 174, 251/170, 315

[56] References Cited

U.S. PATENT DOCUMENTS

| | | | |
|---|---|---|---|
| 2,810,543 | 10/1957 | Bryant | 251/172 |
| 3,346,234 | 10/1967 | Allen | 251/174 |
| 3,504,885 | 4/1970 | Hulsey | 251/174 X |
| 4,083,376 | 4/1978 | Alaniz | 251/172 X |
| 4,280,522 | 7/1981 | Pechnyo et al. | 251/174 X |
| 5,090,661 | 2/1992 | Parks, Jr. et al. | 251/174 X |

Primary Examiner—Martin P. Schwadron
Assistant Examiner—Kevin L. Lee
Attorney, Agent, or Firm—David M. Ostfeld

[57] ABSTRACT

A high pressure ball valve is disclosed having dual, independent seat to ball seals, the dual seal arrangement including a primary seal and a secondary seal, each operating independently, in proper sequence, each acting in the same direction, and each being pressure actuated, with provision for relieving excess fluid pressure.

6 Claims, 7 Drawing Sheets

DUAL SEAL BALL VALVE

CROSS REFERENCE TO RELATED APPLICATIONS

Application Ser. No. 889,792 filed May 28, 1992, U.S. Pat. No. 5,338,003, is a continuation-in-part of application Ser. No. 798,448, filed Nov. 26, 1991, U.S. Pat. No. 5,320,327, which is a continuation of application Ser. No. 685,219, filed Apr. 12, 1991, now abandoned, which is a continuation of application Ser. No. 493,045, filed Mar. 12, 1990, now abandoned. This application is also a continuation-in-part of application Ser. No. 758,018, filed Sep. 12, 1991, now abandoned, which is a continuation-in-part of application Ser. No. 504,512 filed Apr. 4, 1990, now abandoned, which is a continuation-in-part of application Ser. No. 493,045 filed Mar. 12, 1990, now abandoned. Application Ser. No. 493,045 is a continuation of application Ser. No. 343,474, filed Apr. 26, 1989, now abandoned, which is a continuation of application Ser. No. 189,574, filed May 3, 1988, now abandoned, which is a continuation of application Ser. No. 049,231, filed May 13, 1987, now abandoned, which is a continuation of application Ser. No. 659,614, filed Oct. 11, 1984, now abandoned, which is a continuation-in-part of application Ser. No. 551,589, filed Nov. 14, 1983, which has issued to U.S. Pat. No. 4,566,671.

TECHNICAL FIELD

The present invention relates generally to the sealing of ball valves against fluid pressure, and more particularly to valves having dual seals, one seal being a primary seal, the other being a secondary seal.

BACKGROUND OF THE INVENTION

Ball valves have been commonly used for years and have employed stopper members of generally spherical shape. These members are rotated about one of its axes to align or disalign its through-port with the flow passages of the body member to establish the open and closed positions of the stopper. The provision of the stopper in spherical form has a number of obvious and distinct inherent advantages, not the least of which is overall compactness of the valve and that it requires only one quarter turn of the spherical stopper to move from open to close and from close to open, as distinguished from the gate type valve where the stopper member must be shifted axially to and from closed position. As distinguished from the tapered or conical type of stopper, all difficulties of the "wedging" effect are avoided.

Ball valves generally provide for a single seal between the ball and the seat. See for example, U.S. Pat. No. 3,504,885 to Hulsey and U.S. Pat. No. 3,339,886 to Grove. In addition, secondary seals are known in the art. See U.S. Pat. No. 4,377,273. The problem of maintaining an effective seal in high pressure ball valves has long been recognized. Present designs of sealing assemblies generally provide for a single seal between the ball and the seat and some designs provide an auxiliary system for injecting a flowable sealant to the sealing areas in order to close off leaks which frequently develop between the regular sealing surfaces of the seats and closure members. Also, some designs provide the use of pressure enhanced sealing means. Prior efforts to solve the problem of maintaining a satisfactory seal in ball valves are shown in Hulsey U.S. Pat. No. 3,504,885 and Grove U.S. Pat. No. 3,339,886 referenced above. In Hulsey U.S. Pat. No. 3,504,885, two seals are shown on each side of the valve and both seals are pressure enhanced; however, only one of the seals acts to seal fluid flow in the direction of fluid flow. When one of the seals is pressure enhanced by fluid flow in one direction, the other is pressure relieving by the same fluid flow. In Grove U.S. Pat. No. 3,339,886, FIG. 9 shows a ball valve with one pressure enhanced seal which is effective only on the downstream side. In Grove U.S. Pat. No. 3,339,886, when fluid flow is reversed, the one seal is pressure relieving.

It is an objective of the invention to provide a long-lived multiple seal valve which is capable of effectively controlling fluid flow regardless of pressures and regardless of the nature of the fluid being controlled—a valve that is one in which the integrity of the seals can be tested in the line, and one that relieves excess fluid pressure.

SUMMARY OF THE INVENTION

The present invention provides the advantage of dual seals between the ball and the valve seat. In addition to doubling the sealing capacity, the operating arrangement of the dual seals is such that the dual seals protect each other in operation.

As the spherical stopper or ball is moved toward closed position, the primary seal is activated first, stopping the fluid flow. Continuing movement to closed position activates the secondary seal. With the fluid flow stopped by the primary seal, the secondary seal is activated with no flow across it during closing, preventing erosion of the secondary seal from damage by high differential-pressure fluid flow across it during closing. The primary seal protects and prolongs the life of the secondary seal.

The process is reversed when the valve opens. As the ball rotates toward the open position, the secondary seal is deactivated before the primary seal is opened. This sequence of operation, with the secondary seal opening first allows the secondary seal to be opened with no fluid flow across it during its opening—the primary seal prevents flow while the secondary seal is being opened. This prevents erosion of the secondary seal from damaging high differential-pressure fluid flow during its opening.

The two separate sealing mechanisms, the primary seal and the secondary seal, seal independently as well as in combination.

The valve is shown of two types. In one type the ball is mounted for rotation about a fixed axis, with upstream primary and secondary seals moving to contact and seal against the ball. This type provides a block and bleed function and a pressure relief function for preventing damage to the ball valve if fluid pressure in the valve body exceeds a selected pressure level. In the other type the ball moves in the direction of the flow to contact and seal against downstream primary and secondary seals. This type provides a means for in line checking the seal integrity of the downstream seals.

A distinct advantage of the invention is that it provides a block and bleed feature by providing upstream and downstream primary and secondary seals that are activated by spring members and the pressure of fluid in the conduit.

Another distinct advantage of the invention is that it provides a bleed feature between the downstream primary and secondary seals to test the downstream seal integrity.

More specifically, the present invention includes a ball valve comprising a valve body having a valve chamber there within and a pair of flow passages through the valve body aligned at opposite sides of the valve chamber. The valve body further has a recess around the inner end of each of the aligned flow passages with a seat member disposed therein. A ring shaped seat member is disposed in each recess around the inner end of the flow passages and a secondary seal member is slidably disposed around at least one of the ring shaped seat members. In one embodiment, the secondary seal member comprises a ring shaped support element including means for actuation by cooperating cam means. A seal means is supported by the ring shaped support element facing the ball. The ball valve further includes cooperating cam means associated with the ball and with the ring shaped support element for moving the ring shaped support element toward the ball when the ball is moved toward the closed position to form a secondary seal between the secondary seal member and the ball, and for de-energizing the secondary seal prior to deactivating the primary seat to ball seal.

In an embodiment of the present invention, the cooperating cam means includes a caming edge part of a caming means attached to the ball. Pin followers are carried by the support element and adapted to engage with and follow the caming edge. An energizing ring is disposed between the ring shaped support element and the seal means. A spring is disposed between the support element and the energizing ring. A compressible elastomeric seal ring is disposed between the energizing ring and the seal means such that movement of the ring-shaped support element forces the energizing ring against the compressible elastomeric seal ring to form the secondary seal upon closing and such that slight movement of the ring-shaped support element away from the ball allows the energizing ring to be forced outwardly by the compressible, elastomeric seal ring to de-energize the secondary seal. A passage is provided for testing the sealing effectiveness of the primary and secondary seals with the valve under pressure.

In yet another embodiment of the present invention, the secondary seal number comprises a ring shaped support element including means for actuation by cooperating cam means, a seal means and a spring. The seal means comprises a seal ring carrier having a face seal ring to seal between the seal ring carrier and the ball and a second seat outer diameter seal. A port means is provided to test the sealing effectiveness of the primary and secondary seals with the valve under pressure.

In yet another simplified alternative embodiment of the present invention designed to simplify and reduce the cost of the secondary seal assembly, the secondary seal assembly comprises a seal ring carrier, a face seal ring and a seat O.D. seal ring. Sealing contact between the secondary seal assembly and the ball is maintained by a spring means either a belleville spring, coil springs, or other spring means. A port means is provided to test the sealing effectiveness of the primary and secondary seals with the valve under pressure.

I have shown different types of dual seal ball valves, but it will be understood that these may be inter-changed at will.

DESCRIPTION OF THE DRAWINGS

For a further understanding of the nature and objectives of the present invention, reference is made to the following detailed description and the following drawings, in which like parts are given like reference numerals, in which.

DETAILED DESCRIPTION OF THE EMBODIMENTS

Figure 1:
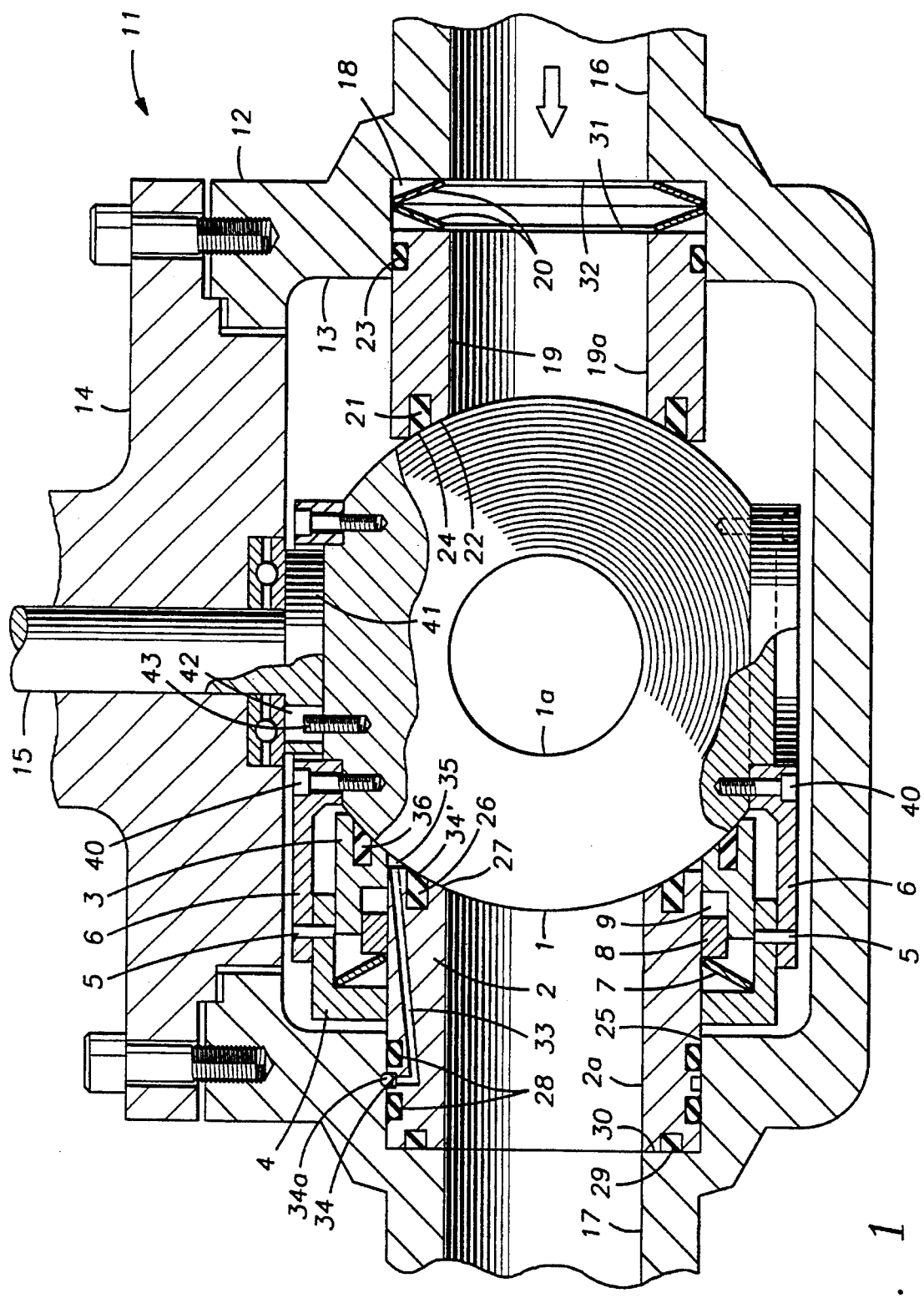
FIG. 1 is a partly sectional, partly elevational view of a ball-type valve in the closed position embodying seat and seal assemblies which is of the type in which the ball moves in the direction of the flow to contact and seal against the downstream seals and in which the secondary seal is mechanically actuated by a caming mechanism.

Referring to FIG. 1, the ball valve 11 includes a valve body 12 which is hollow, having a valve chamber 13 there within. The upper or bonnet portion 14 of the valve 11 may comprise a bonnet of any conventional form which provides a closure of the upper end of chamber 13 and forms a seal between the valve body 12 and a stem 15.

The valve 11 includes a ball element 1 disposed within the chamber 13. The ball 1 has, generally, a spherical surface and is interfaced at the top with the stem 15. The stem 15 is adapted to rotate the ball to the open and closed positions and to allow movement of the ball to contact the seat ring 2. Opposed inlet and outlet flow passages 16 and 17 are provided in main body member 12. The ball has a flowport 1a therethrough which connects passages 16 and 17 in valve open position.

A stepped annular recess 18 is formed around flow passage 16 concentrically into body 12. Recess 18 receives a ring-shaped seal seat member 19, which is in the form of a short cylindrical tubular ring, having interior opening 19a and outward facing endface 31. Endface 31 is juxtaposed with inward facing endface 32 formed in recess 18. Spring or springs 20 are disposed at the bottom of recess 18 to engage between the recess and the upstream side of seat ring 19. Resilient seal 21 is provided around the ball engaging endface 22 of seat ring 19 by an opening formed in seat ring 19, and O-ring seal 23 placed in a second opening formed in seat ring 19 provides a seal around seat ring 19 and the side of recess 18. Seat ring 19 having seal 21 engages against the righthand surface 24 of the ball to form a seal around flow passage 16 at the seat-ball engagement. Ball 1 has its flow port 1a there through which is rotated to be aligned with passage 16 and opening 19a through seat ring 19 when the ball is moved to be opened. Spring 20 serves to maintain the endface 22 and seal 21 of seat ring 19 engaged with right hand surface 24 of ball 1, which in turn maintains engagement with seat ring 2. The distance between the endface 31 of seat ring 19 and the endface 32 of annular recess 18 along the centerline of passage 16 is sufficient to allow seat 19 to be moved away from ball 1 to provide clearance for top entry installation of ball 1 between seat 19 and seat 2. However, alternatively, instead of the space between endface 31 and endface 32 provided to allow top entry of the ball 1 into the valve body chamber 13, this space is greatly reduced when the valve 11 is designed for end entry of the ball 1, e.g., if the ball 1 is installed through one of the ends of the valve body 12 rather than through the top. Because of the differential annular area of the face of seal ring 21 and the outer diameter seat seal 23 exposed to fluid pressure, if fluid pressure in valve body chamber 13 is less than that of fluid pressure in channel 16, seat 19 becomes pressure energized toward the ball 1.

A second stepped annular recess 25 formed around flow passage 17 concentrically into body 12 is sized to receive ring-shaped seal seat member 2. Member 2 is in the form of a short cylindrical tubular ring having inferior opening 2a and an outward facing endface abutting endface 30 formed in recess 25. Resilient seal 26 is provided in a recess in the ball engaging face 27 of seat ring 2. Seals 28, such as "O" ring seals, are provided around the outer circumference of seat ring 2, sealing against the inner circumferential surface of the recess 25. Seal 26 engages against the downstream or lefthand surface 34' of the ball 1 to form a seal around flow passage 17 at the seat-ball engagement surfaces. Flow port 1a when rotated to be aligned with passage 19 is also aligned with passage 17 and the opening 2a through seat ring 2. Seat ring 2 is further provided with seal 29 in a recess in the outward facing end of seat ring 2 which engages against endface 30 of the annular recess 25 to provide a seal between ring 2 and surface 30.

The secondary seal member comprises ring-shaped support element 4, including pin follower 5 for actuation by cooperating cam means 6. Seal ring carrier 3 is mounted interiorly to ring shaped support element 4. A compressible elastomeric seal ring 9 and an energizing ring 8 are provided interiorly to seal ring carrier 3. A spring means 7 is further provided abutting the interior facing vertical surface of ring-shaped support element 4. Seal ring carrier 3 supports face seal ring 36 in a recess formed in the interior facing face of seal ring carrier 3.

Passage 33 provided in seat 2 connects annular area 35, which is between resilient seal 26, resilient seal 36 and resilient seal 9 with passage 34, which is formed in seat ring 2 between seal rings 28. Passage 34 communicates passage 33 through port 34a to (not shown) outside the valve body 12.

Figure 1B:
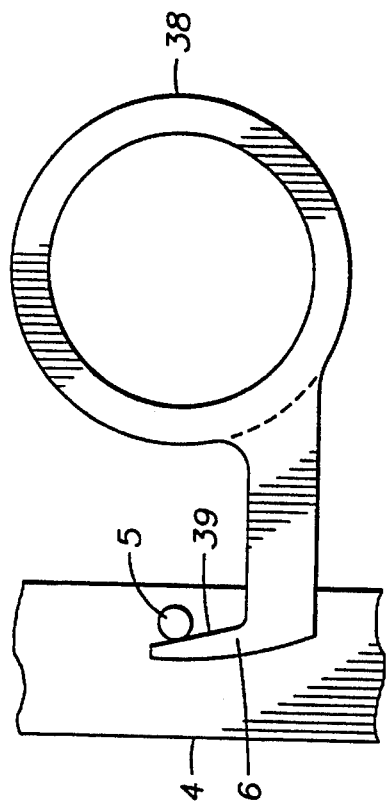
FIG. 1B is a simplified version of the cam mechanism of a secondary seal member of FIG. 1.
Figure 1A:
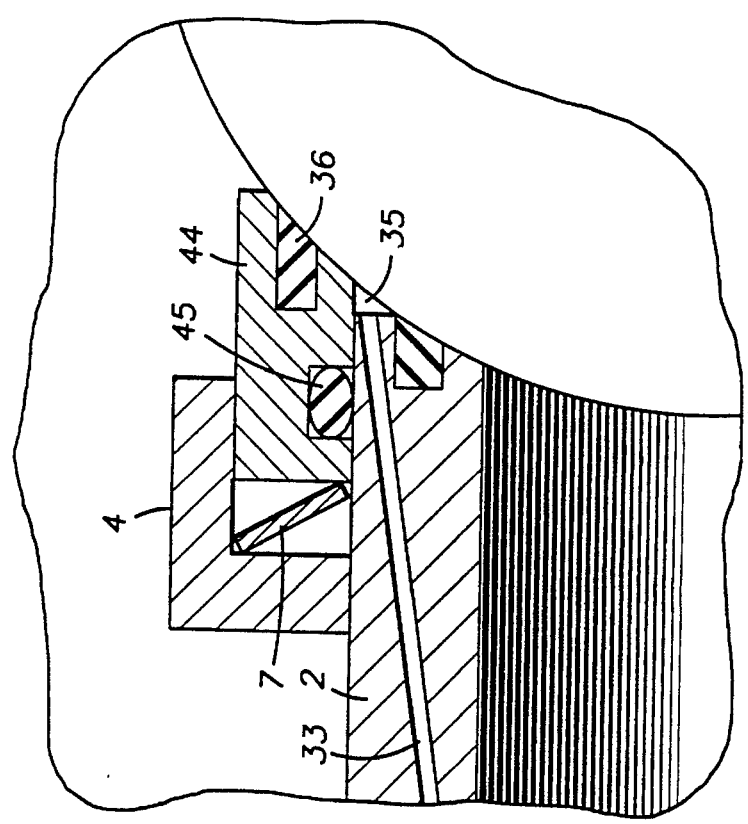
FIG. 1A is a simplified version of a secondary seal member of FIG. 1.

Referring to FIG. 1A, an alternate secondary seal member is shown for use in general configuration FIG. 1. The alternate secondary seal member comprises ring-shaped support element 4, seal ring carrier 44, face seal ring 36, an elastomeric seal ring 45 such as an "O" ring, and spring means 7.

Cam means 6 [FIG. 1B] includes circular portion 38 and caming edge 39. Caming edge 39 is adapted to engage pin follower 5. Circular portion 38 of cam means 6 includes means for securely attaching cam means 6 to ball 1 by bolting 40 or other means.

Referring to FIG. 1, a flange 41 is formed integrally on the bottom of stem 15 which contains holes 42 which receive pins 43 which are attached to ball 1. Holes 42 are somewhat larger in diameter than pins 43 to allow some relative motion between stem 15 and pins 43 which in effect provides relative motion between stem 15 and ball 1. Alternatively, but not shown, the interface connection between stem 15 and ball 1 could be an integrally formed tang on the bottom of stem 15 of rectangular or other geometric shape fitting loosely into a mating slightly larger recess in the top of the ball. The described connections between stem 15 and ball 1 provide for the stem to rotate the ball while allowing the ball to move in the flow path direction to contact seat 2.

FIG. 1 illustrates operation of a ball valve in which the ball and other internal parts can be installed and removed through the bonnet end of the valve, a distinct advantage for field maintenance where the valve can be repaired without having to remove the valve from the flow line. FIG. 1 illustrates a ball valve having a primary upstream seal, a primary and secondary downstream seal, the downstream secondary seal being cam actuated and pressure energized, and a passage means for verifying the sealing integrity of the downstream primary and secondary seals.

The upstream seal is mechanically actuated and pressure energized. Upstream seat 19 is mechanically urged into contact with ball 1 by springs 20 moving ball 1 to maintain contact with downstream seat 2. The fluid pressure in passage 16 acts against endface 31 of seat 19 and against opposite endface 32. Since O-ring seal 23 forms a seal between seat 19 and valve body 12 and face seal ring 21 forms a seal between seat 19 and ball 1, the fluid pressure in passage 16 acts against the differential surface area. The surface area of endface 31 which is exposed to passage 16 fluid pressure is sized such that this area is greater than the surface area to which such pressure is applied at endface 22 to provide a differential surface area. Accordingly, seat 19 is forced against ball 1 by fluid pressure to provide a pressure energized primary upstream seal.

Figure 3:
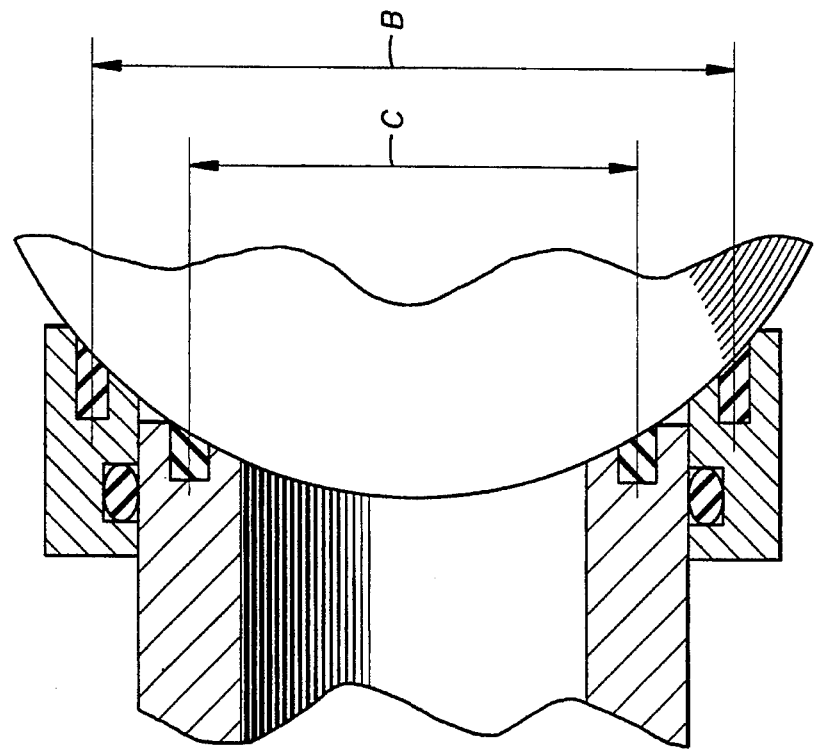
FIG. 3 is a schematic section view showing the annular area of the secondary seals of FIGS. 1, 1A, and 2, upon which fluid pressure acts to pressure energize the secondary seal.

The ball 1 is rotated to close by turning stem 15 which bears on pins 43 turning the ball. The ball has some freedom of movement relative to the stem in the amount of clearance between holes 42 and pins 43 and is free to move in the direction of fluid flow to contact seat 2. In the closing operation the ball makes a first seal between seal ring 26 and the ball, stopping the fluid flow. Continued movement of the ball to close mechanically actuates the face seal ring 36 by cam means 6 acting on pins 5, moving the face seal ring 36 toward the ball 1. Support element 4 moves spring 7 against the energizing ring 8 which moves and compresses elastomeric seal ring 9 which forms a seal on the seat OD and moves the face seal ring 36 into contact with the ball 1 effecting a secondary seal between face seal ring 36 and the ball 1. The secondary seal is activated after the fluid flow has been stopped by the primary seal, thereby preventing erosion damage to the secondary seal by high differential-pressure fluid flow across it during closing. The secondary face seal ring 36 is mechanically actuated and if the primary seal leaks becomes pressure energized by fluid pressure in the body chamber 13 acting on the difference in annular area B minus annular area C, as illustrated in FIG. 3.

In opening the reverse actions occur. As the ball 1 is rotated to open, cam means 6 is rotated out of caming engagement with pins 5 permitting spring 7 to force support element 4 in the direction away from the ball 1, relieving the load on the energizing ring 8 and allowing the compressible elastomeric seal ring 36 to de-energize losing its seal on the seat OD and de-energizing the secondary seal means. In opening the secondary seal, it is deactivated with no fluid flow across it during opening because the primary seal 26 is preventing fluid flow. Continued rotation of the ball 1 to opening then deactivates the primary seal.

With the valve 11 in the closed position, the downstream primary and secondary seals 26, 36 can be tested for effectiveness by opening passage 34a which is connected to outside the valve body 12 and to the space 35 between seals 26, 9, 36. With all three seals sealing there will be no flow through passage 34a. If any of the three seals leak, the leak will be detected at 34a. This passage is also usable for injecting a lubricant between the primary and secondary seals, if desired.

In this embodiment three seal means are incorporated, a primary upstream seat to ball seal, a downstream primary seat to ball seal, and a secondary downstream seat to ball seal.

An alternate secondary seal member for FIG. 1 embodiment is shown in FIG. 1A. In this alternate arrangement, seal ring carrier 3 of FIG. 1 is replaced by a seal ring carrier 44. Energizing ring 8 and compressible elastomeric seal ring 9 are replaced by an elastomeric seal ring such as an "O" ring 45 which seals between the seal ring carrier 44 and the outer diameter surface of seat 2. Opening and closing the valve with this alternate secondary seal member is the same as for FIG. 1 with support element 4 and caming means 6 providing the initial mechanical actuation of the secondary seal means. The secondary seal becomes pressure energized by fluid pressure in the valve body acting on pressure differential area created by face seal ring 36 and seat outer diameter seal ring 45, as illustrated in FIG. 3, the differential area being area B minus area C. Spring 7 prevents mechanically overloading the seal means when activating the seal means and acts to retract support element 4 when deactivating the seal means for FIG. 1 and FIG. 1A.

Figure 2:
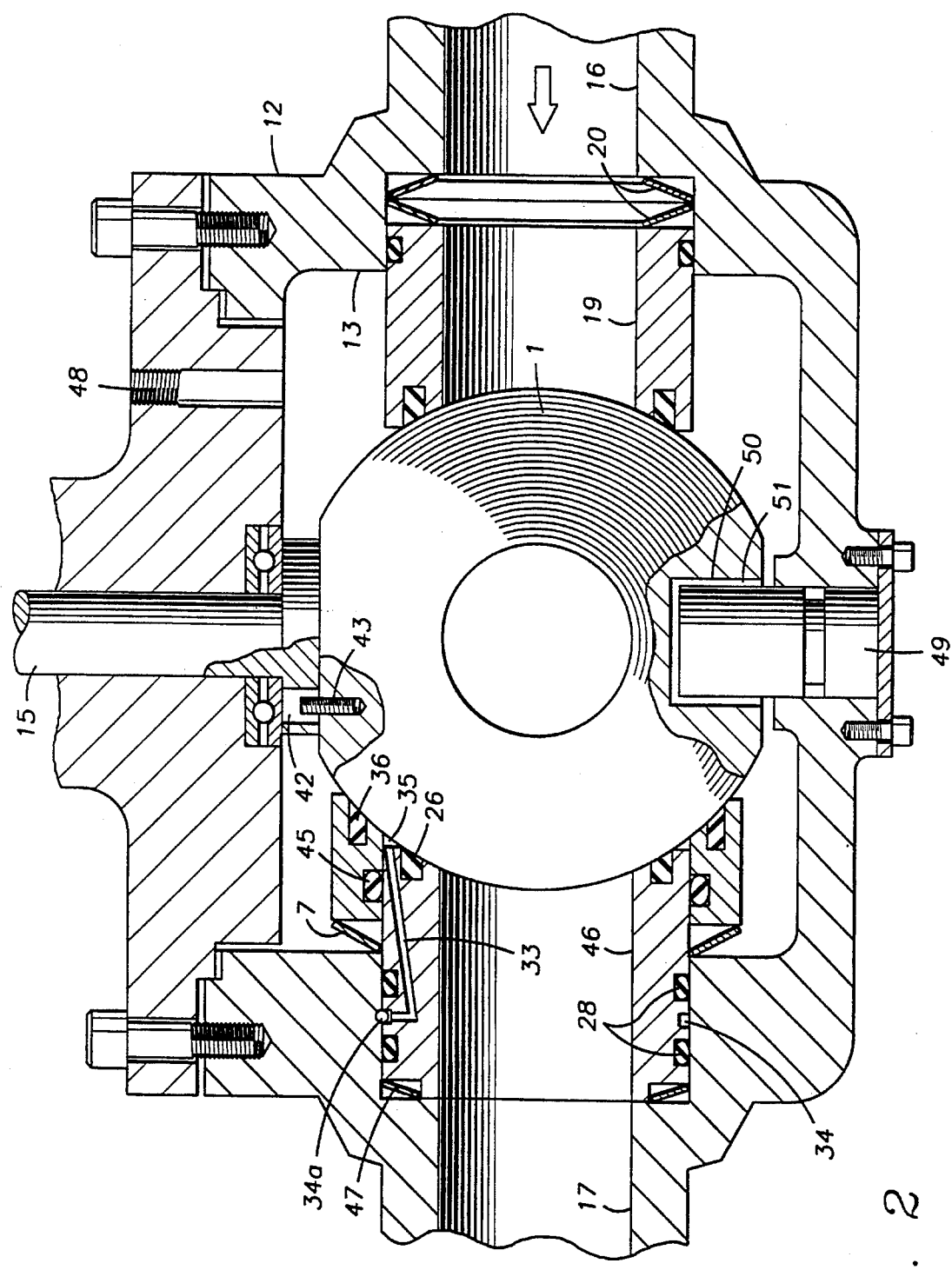
FIG. 2 is a partly sectional, partly elevational view of the ball-type valve in the closed position embodying seat and seal assemblies which is of the type in which the ball moves in the direction of the flow to contact and seal against the downstream seals and in which the secondary seal is mechanically actuated by a spring.

An alternate embodiment of the invention is shown in FIG. 2. The upstream seat 19 is the same as, and functions the same as, in FIG. 1. A body port 48 is also provided. The downstream primary seat 46 is the same as in FIG. 1 except that seat 46 does not include seal ring 29 but includes spring 47 which mechanically biases seat 46 into contact with ball 1, whereas on the upstream side of the valve, the ball 1 is urged into contact with the downstream seat 46 by springs 20 acting against upstream seat 19, which acts against ball 1 and upstream seals activate as a result of upstream fluid pressure. Primary seat 46 becomes pressure energized when fluid pressure from channel 17 is greater than fluid pressure in the valve body 13. Fluid pressure in channel 17 acting on the differential annular area created by the annular seal area of seat outer diameter seals 28 minus the annular area of face seal 26 causes the primary seal to become pressure energized in the direction toward ball 1. The downstream secondary seal member is the same as that shown in FIG. 1A except there is no caming mechanism. In FIG. 2 embodiment the initial mechanical actuation of the secondary seal means is provided by spring 7. The secondary seal becomes pressure energized by fluid pressure in the valve body 13 acting on pressure differential area created by face seal ring 36 and seal ring 45 acting on the outer diameter of seat 46. As illustrated in FIG. 3, the differential area is the area B minus area C.

For FIG. 2, as in FIG. 1 and FIG. 1A. embodiments, with the valve in the closed position, the downstream primary and secondary seals can be tested for effectiveness by opening passage 34a which is connected from outside the valve body through passages 34, 33 to the space 35 between seals 26, 45, 36.

In the embodiment shown in FIG. 2, the valve 11 also has a block and bleed feature, that is, in the closed position, fluid in channel 16 pressure energizes and seals seat 19 against the ball, preventing fluid in channel 16 from entering into the valve body chamber. Fluid pressure in channel 17 energizes and seals seat 46 against the ball, preventing fluid in channel 17 from entering into the valve body chamber. With both the upstream seat 19 and downstream seat 46 preventing fluid from entering into the valve body 13 from their respective channels, body port 48 can be opened to test the sealing ability of both seats. In this block and bleed operation if both seats are sealing, there will be no buildup of pressure in the valve chamber 13.

The embodiment in FIG. 2 is also self-venting. Self-venting of valve body chamber 13 into the upstream side 16 of the valve occurs whenever the pressure in chamber 13 exceeds the pressure in line 16 by a predetermined amount. The spring force of springs 20 and the forces applied by fluid pressure in the valve body 13 on the end of seat 19 and by fluid pressure in channel 16 on the end of seat 19 are selected so that if the pressure in valve body chamber 13 exceeds the pressure in line 16 by some predetermined amount, the force applied against the endface of seat 19 by the body 13 fluid pressure overcomes the force of springs 20 and the seat 19 opens away from ball 1.

The ball in FIG. 2 is rotated by stem 15 in the same manner as in FIG. 1, and the ball has some freedom of movement relative to the stem in the amount of clearance between holes 42 and pins 43 and is free to move either toward the downstream or upstream seats, depending upon the direction of the line fluid. FIG. 2 embodiment also has a lower stem 49 held in place in body 12 and extending into hole 50 in ball 1. Hole 50 is somewhat larger than stem 49 creating space 51 which permits some freedom of movement of the ball relative to lower stem 49. This arrangement of stem 15 and lower stem 49 provides a trunion mounting of ball 1 as described earlier, and ball 1 moves only in the amount permitted by clearances 42, 51.

Figure 4:
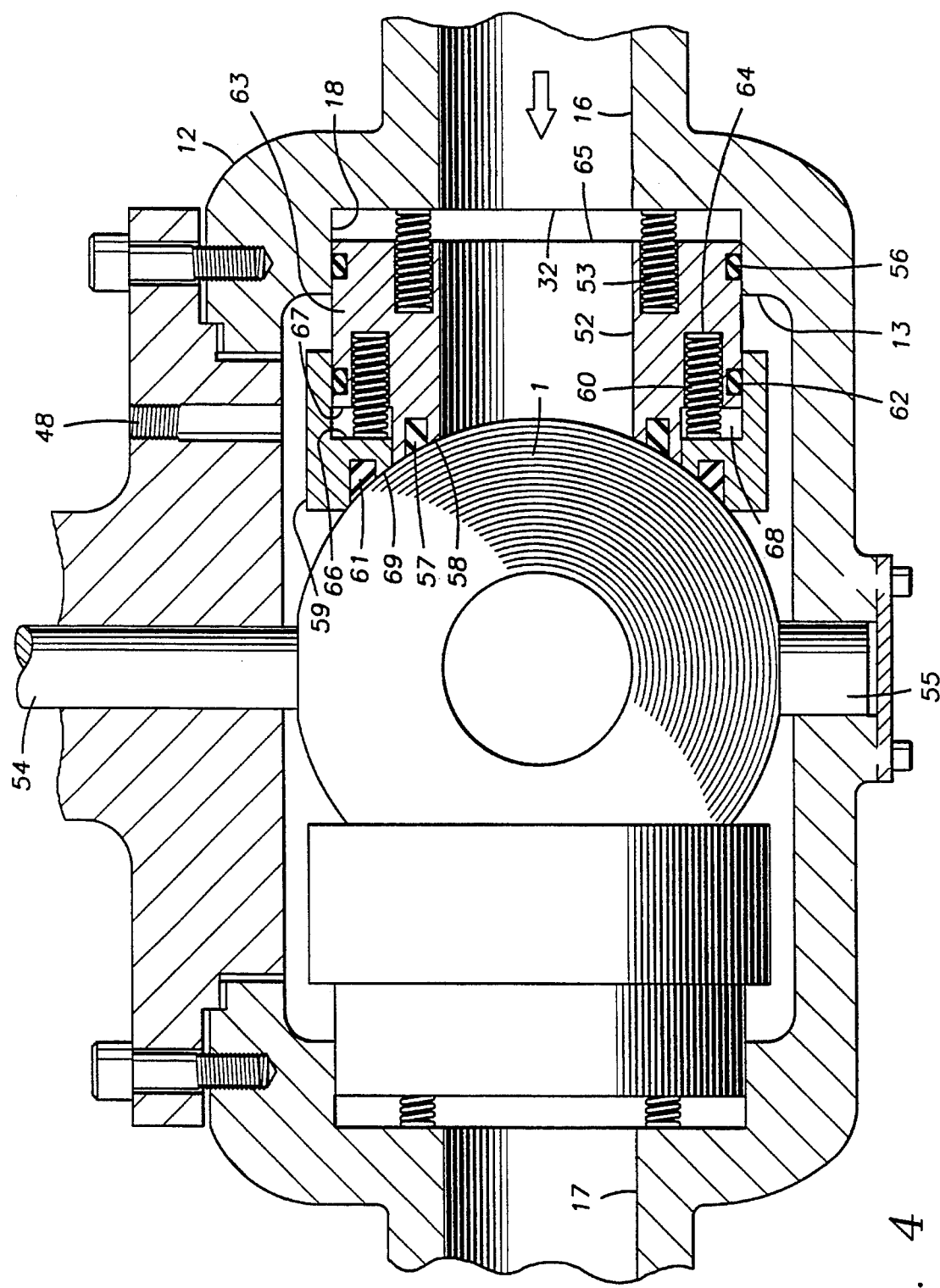
FIG. 4 is a partial sectional, partly elevational view of a ball-type valve embodying seat and seal assemblies which is of the type in which the upstream primary and secondary seals move to contact and seal against the ball.

FIG. 4 shows an embodiment of the dual seal ball valve 11 in which both primary and secondary seals are upstream seals, that is, they seal on the upstream pressure side of the valve. In this embodiment, ball trunions 54, 55 extending vertically from a rigid attachment to the ball 1 pivotally mounts the ball 1 for rotation and prevents the ball 1 from moving either upstream or downstream. Ring-shaped seat 52 on the upstream side of the valve having endface 65 is disposed in stepped recess 18 having endface 32 and is urged into contact with ball 1 a by plurality of springs 53.

O-ring seal 56 provides a seal between seat 52 and the interior cylindrical surface of stepped recess 18 of valve body 12. A seal ring 57 is located in an inner facing recess of endface 58 of ring-shaped seat 52 and provides a seal between the endface 58 of seat member 52 and the ball 1. A secondary seal is also provided, including a ring-shaped seat member 59 slidably mounted around seat member 52. Secondary seat member 59 is biased against ball 1 by a plurality of springs 60 located between wall 64 of enlarged portion 63 of seat member 52 and internal backface 66 of seat member 59, having as space 68 therebetween. Secondary seat member 59 may be sealed at ball i by seal 61 located in an interior facing recess of the endface of seat member 59 if the primary seal leaks. O-ring seal 62 is provided between the outer circumferential surface of seat member 52 and the inner circumferential surface of secondary seat member 59. O-ring seal 62 is mounted in a groove cut in enlarged portion 63 of seat member 52. Enlarged portion 63 has an endface 67.

Springs 53 are sized to provide a greater spring force than springs 60. As stated previously, springs 53 bias seat member 52 against the ball 1 and springs 60 bias secondary seal member 59 against the ball 1. As springs 60 bias seal member 59 against the ball 1, the reactive force of springs 60 act against wall 64, which is either a hole to accept springs 60, or a wall of a groove machined into seat member 52, tending to force seat 52 away from ball 1 by compressing springs 53. Therefore, springs 53 are sized stronger than springs 60 to prevent springs 60 from forcing seat member 52 away from ball 1. Both spring members 53, 60 are sized such that a predetermined pressure differential between pressure in the body cavity 13 and in channel 16 will force seats 59 and 52 away from the ball, relieving the excess pressure in the valve body cavity into channel 16. In this embodiment an identical set of seats would be provided for upstream and downstream.

The space between the endface 65 of seat 52 and the endface 32 of stepped annular recess 18 and the space between the internal backface 66 of seat member 59 and endface 67 of the enlarged section 63 of seat 52 are sized to allow seat 52 to move away from the vertical centerline of the valve to permit installation of the ball from the bonnet end of the valve.

Referring to FIG. 4, the primary seal is energized at the high pressure side of the ball, e.g. the upstream side with fluid pressure from channel 16. Springs 53 biases primary seat 52 against ball 1 to provide an initial seal against fluid pressure in line 16 by face seal 57 bearing against the surface of ball 1. The fluid pressure in line 16 acts against the endface 65 of seat 52 and against the opposite endface 58. Because O-ring seal 56 forms a seal between seat 52 and valve body 12 and face seal ring 57 forms a seal between seat 52 and ball 1, the fluid pressure in channel 16 acts against surfaces of different area. Endfaces 65, 58 are sized such that the surface area to which the line 16 fluid pressure is applied at endface 65 is greater than the surface area to which such pressure is applied to endface 58 to provide a differential surface area.

Figure 5:
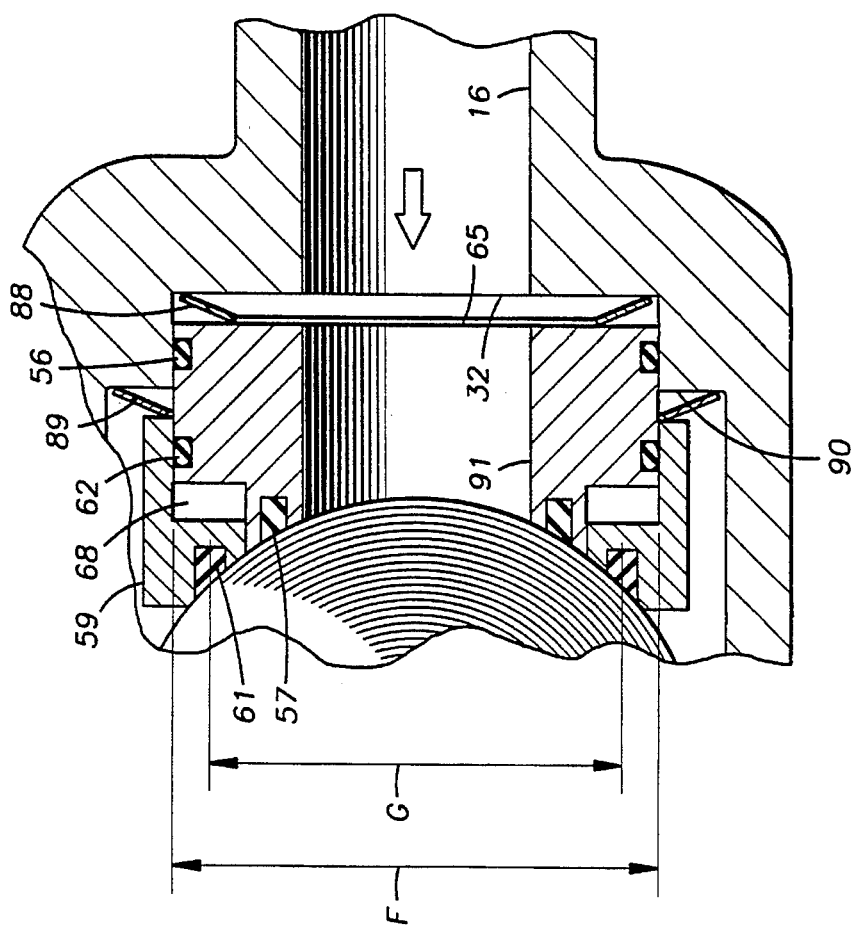
FIG. 5 is a schematic section view showing the annular area of the secondary seal of FIG. 4 upon which fluid pressure acts to pressure energize the secondary seal.

Accordingly, seat 52 is forced against ball 1 by the fluid pressure and the primary seal is effected, preventing leakage at endface 58. If the primary seal at endface 58 is lost due to wear or damage at endface 58, the fluid from channel 16 will pass between seat 52 and the ball 1 to the secondary seat seal member 59, entering space 68, and because of the initial engagement provided for seal 61 by springs 60, the force applied at endface 58 is now applied also at endface 66 of the secondary seat seal member 59 and at endface 67 of the primary seat 52. The force of the fluid pressure in channel 16 in space 68 is also applied against endface 69 of the secondary seat seal member 59 and forces endface 69 against the ball 1 to create the secondary seal preventing leakage from channel 16 into the valve body. As shown in FIG. 5, the differential surface area, area F minus area G, acted upon by fluid pressure in space 68 provides the force to establish the secondary seal.

In FIG. 4, the upstream primary and secondary seal members and the downstream primary and secondary seal members are identical, being mirror images of each other. With identical seal members upstream and downstream, the valve provides a block and bleed feature. With the valve in the closed position, the body chamber 13 can be bled through port 48. If the upstream and downstream seals are energized and sealing, there will be no buildup of pressure in valve body chamber 13, verifying that the seals are effective.

The embodiment of FIG. 4 is also self-venting. Self-venting of the valve body chamber 13 into either the downstream or upstream side of the valve occurs whenever the pressure in chamber 13 exceeds the pressure in either line 16 or 17 by a predetermined amount. The spring force of springs 53, 60 are selected so that if the pressure in valve body chamber 13 exceeds the pressure in line 16 or line 17 by some predetermined amount, the load on the secondary and primary seals overcomes the force of springs 53, 60, and the secondary and primary seats open away from the ball 1, relieving the pressure in valve chamber 13.

The embodiment in FIG. 5 is similar to FIG. 4 except that springs 53, 60 of FIG. 4 are replaced by springs 88, 89, respectively, of FIG. 5. In addition, whereas the spring means 60 of FIG. 4 acts between secondary seat member 59 and primary seat member 52, in FIG. 5 spring means 89 acts between secondary seat member 59 and face 90 in valve chamber 13. The functioning of FIG. 5 is similar to that of FIG. 4. The primary seat 91 functions the same as FIG. 4. Spring 89 acts to maintain contact between seal 61 and ball 1. If the primary seal 57 is lost due to wear or damage, the fluid from channel 16 will pass into space 68, and the secondary seal becomes pressure energized due to the pressure acting on the differential area provided by seals 62, 61 (area F minus area G).

Figure 7:
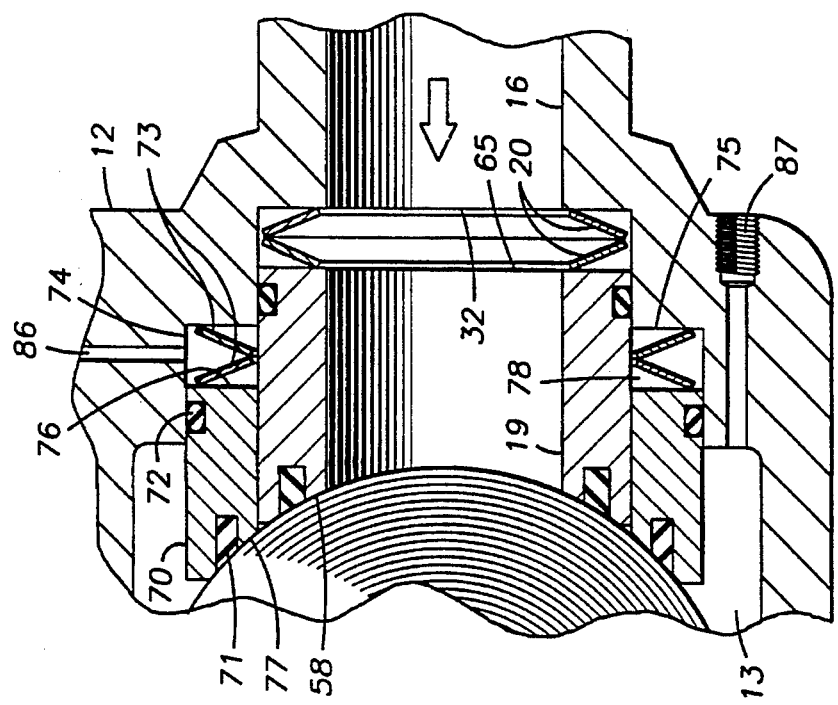
FIG. 7 is a partial sectional, partly elevational view showing upstream primary and secondary seals of the type in which the seals move to contact and seal the ball in which the secondary seal seals in a recess in the valve body.

FIG. 7 is a simplified version of the upstream sealing embodiment shown in FIG. 4. The secondary seal member comprises ring-shaped seal ring carrier 70, face seal ring 71 mounted in a groove in the interior face of seal ring carrier 70, an elastomeric seal ring, such as an O-ring 72, mounted in a groove in the exterior surface of secondary seal ring carrier 70 sealing against the interior surface of stepped annular recess 74 in valve body 12 and spring means 73 located between end face 75 of stepped annular recess 74 and endface 76 of seal ring carrier 70. The operation of the primary seal is described in the description of FIG. 4. The secondary seal member is disposed in stepped annular recess 74 in body 12, having endface 75. Spring or springs 73 are disposed in stepped annular recess 74 to engage between endface 75 of annular recess 74 and endface 76 of seat ring carrier 70. Resilient seal ring 71 is provided in a groove in a ball engaging endface 77 of seal ring carrier 70. O-ring seal 72 formed in a recess of the outer circumference surface of carrier 70 provides a seal between seal ring carrier 70 and the side of recess 74. A port 86 communicates from space 78 to outside the valve body.

In operations of FIG. 7, the operation of the primary seal is the same as described in the operation of the primary seal of FIG. 2 and FIG. 4. If the primary seal at endface 58 is lost due to wear or damage at endface 58, the fluid from channel 16 will pass between seat 19 and the ball 1 to the secondary seal member entering space 78. Because of the initial contact provided seal 71 by springs 73, the line pressure applied at endface 58 is now applied also at endface 76 of the secondary seal ring carrier 70, at endface 75 of annular recess 74 and endface 77 of seat ring carrier 70. With O-ring seal 72 and face seal ring 71 preventing leakage of the fluid in space 78 from bypassing these seals into the valve body 13, the fluid in space 78 acting on differential annular area created by O-ring seal 72 and face seal ring 71 provides the force to establish a pressurized secondary seal.

By providing identical mirror image primary and secondary seals upstream and downstream the valve provides a block and bleed feature. With the valve in the closed position, the valve body chamber 13 can be bled through a port 87 provided to the chamber 13 as shown in FIG. 7. Port 87 connects the valve body chamber 13 outside the valve body.

If the upstream and downstream seals are energized and sealing, there will be no buildup of pressure in the valve body chamber verifying that the seals are effective. The embodiment of FIG. 7 is also self-venting. Self-venting of the valve body chamber 13 into either the downstream or upstream side of the valve occurs whenever the pressure in chamber 13 exceeds the pressure in either line 16 or 17 by a predetermined amount. The springs 73 and 20 are selected so that if the pressure in valve body chamber 13 exceeds that in line 16 or line 17 by some predetermined amount, the load on the secondary and primary seals overcomes the force of spring 73 or spring 20 and the secondary and primary seals open away from the ball 1 relieving the pressure in valve chamber 13.

In this embodiment, sufficient space is provided between endface 65 and endface 32 and between endfaces 75, 76 to allow seats 19, 70 to be retracted to allow installing the ball 1 through the bonnet end of the valve. This space may be greatly reduced when the valve is designed for end-entry of the ball 1, e.g., the ball 1 is installed through one end of the valve rather than through the top.

A Port 86 extends to the chamber 78 and provides a channel for injecting a lubricant or a sealant into space 78.

Figure 6:
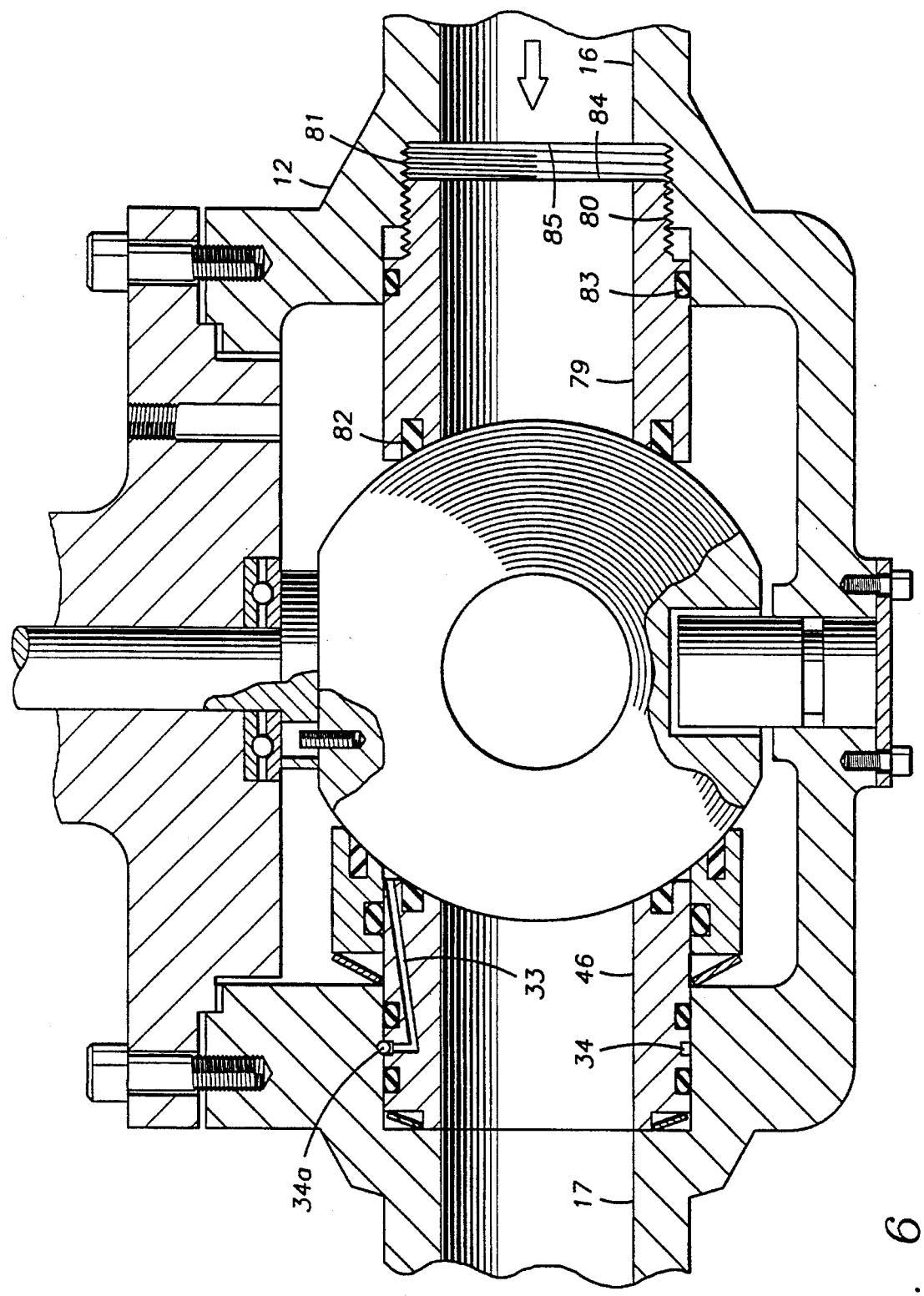
FIG. 6 is a partial sectional, partly elevational view showing a seat which is threaded into the body.

Referring to FIG. 6, seat 79 is threadedly connected to valve body 12 by means of threads 80 which engage mating threads 81 provided in valve body 12. The face seal ring 82 is provided in the seat endface contacting the ball 1, and O-ring seal 83 located in a groove in seat 79 provides a seal between the outer diameter of the seat 79 and the valve body 12. Seat 79 can be threaded in the direction toward channel 16 and away from the center of the valve to allow top entry from the bonnet side of the ball 1 as shown in FIG. 6 or for removal of the ball 1 from the valve body cavity 13. The space between seat endface 84 and valve body endface 85 provides the space for movement of the seat 79 away from the ball 1. After the ball 1 is in place in the valve body 12, seat 79 is threaded toward the ball and making contact with the ball biases the ball into contact with seat 46. With fluid pressure coming from upstream channel 16 the downstream primary and secondary seals function as described for FIG. 2. When fluid pressure comes from channel 17, the primary and secondary seals on the channel 17 side act as described in FIG. 2, and the ball 1 is biased toward and in contact with seat 79 by ball 1. A seal is also formed between the ball 1 and seat face ring 82, and O-ring seal 83 seals between seat 79 and body 12. The stem to ball 1 connections are the same in FIG. 6 as those in FIG. 2, permitting the ball 1 to have some movement to contact either seat, the direction of movement depending upon the direction of fluid flow.

Figure 8:
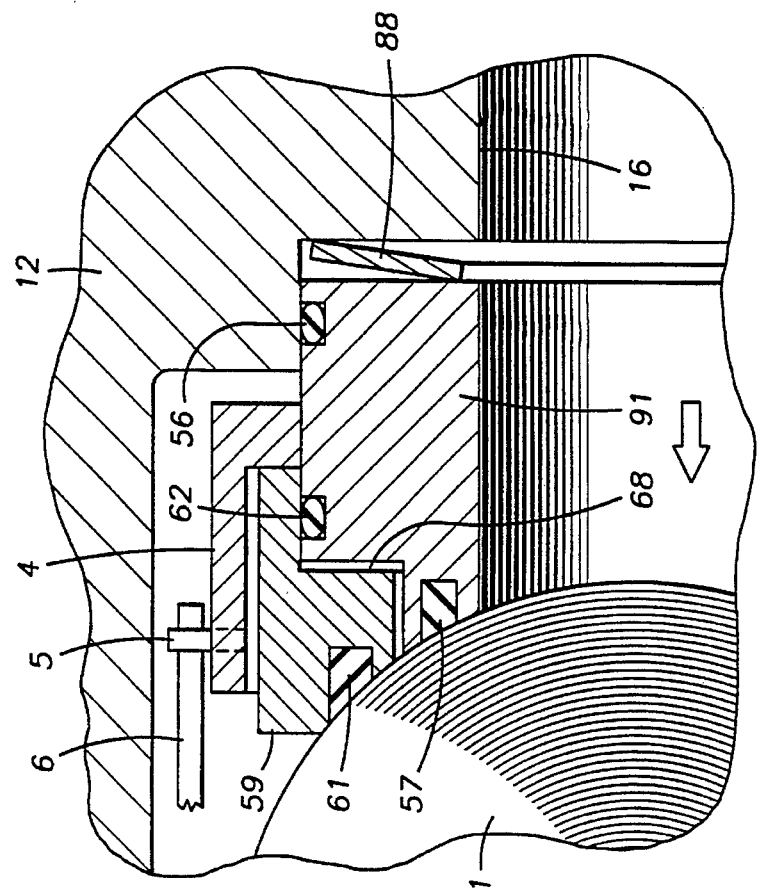
FIG. 8 is a partial sectional view, partly elevational view showing upstream primary and secondary seals, with the secondary seal being cam actuated.

FIG. 8 is an upstream sealing embodiment combining features of FIG. 1 and FIG. 5. O-ring seal 56 located in a groove of seat 91 seals between primary seat 91 and body 12. O-ring seal 62 located in a groove of seat 91 seals between primary seat 91 and secondary seal ring 59. Face seal ring 57 in the endface of seat 91 seals between seat 91 and ball 1. Face seal ring 61 in secondary seal ring 59 seals between seal ring 59 and ball 1.

In operation, as the ball is moved toward the closed position, the primary seal 57 is activated first. Spring 88 urges seat 91 toward ball 1, forcing face seal ring 57 into contact with ball 1. Line pressure in conduit 16 acting on the differential area, created by seal 56 and seal 57, pressure energizes primary seal 57. Continued movement toward the closed position causes contact of the secondary seal. As described in FIG. 1, continued movement of the ball to the closed position mechanically causes contact at the face of the seal ring 61 by cam means 6 acting on pins 5, moving face seal ring 61 toward the ball 1. Support element 4 moves secondary seal ring 59 which moves face seal ring 61 into contact with ball 1 for permitting a secondary seal between face seal ring 61 and ball 1. If the primary seal 57 is lost due to wear or damage, the fluid from channel 16 will pass between seat 91 and the ball 1 into space 68, and because of the initial engagement provided for seal 61 by the caming means, the fluid pressure in space 68 acting on the area differential created by seal 62 and seal 61 pressure energizes the secondary seal toward the ball 1. As ball 1 is rotated to open, cam means 6 is rotated out of caming engagement with pins 5 releasing the mechanical loading on secondary seal ring 59. Continued rotation of ball 1 to open releases the pressure loading of seal 61 while seal 57 stays energized. This de-energizes the secondary seal with no fluid flow across it since primary seal 57 is still engaged. Continued rotation of ball 1 to opening then deactivates primary seal 57.

Accordingly, because many varying and different embodiments may be made within the scope of inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A ball valve having an upstream side and a downstream side, subject to upstream fluid pressure, from fluid passing through the valve from upstream to downstream, comprising:

a. a valve body having a valve chamber therein and a pair of flow passages aligned at opposite sides of the valve chamber, each of said flow passages having an inner end facing the valve chamber and additionally having a recess around the inner end of each of the aligned flow passages;

b. a generally spherically stopper member having an imperforate section and a section having a flow passage therethrough, the stopper member being mounted for rotation within the valve body, between a stopper position in which the valve is open and the flow passage of the stopper member aligns with the valve chamber flow passages and a stopper position in which the valve is closed and the imperforate section aligns with the valve chamber flow passages;

c. a valve seat in the downstream recess around the inner end of the downstream flow passage, the valve seat comprising a ring shaped seat, having an inside portion aligned with the downstream flow passage and an outside portion and a sealing surface facing the stopper member and located between the inside portion and the outside portion, between which the stopper member rotates between the open and closed position such that the stopper member may form a primary, bubble tight seal with the ring shaped seat in response to upstream pressure acting on the stopper member when the stopper member is in the valve closed position, whereby the primary seal acts to seal the fluid under pressure from upstream fluid pressure from flowing past the primary seal when the primary seal is formed;

d. a second downstream ring shaped seat member having an endface adjacent the stopper member slidably mounted around the outside portion of the downstream ring shaped seat, the second downstream ring shaped seat member having an interior facing recess facing the valve chamber therearound at the endface of the secondary ring shaped seat member adjacent the stopper member;

e. an elastomeric seal member disposed in the inner recess of the secondary ring shaped seat member;

f. a spring member having selected spring value to provide initial contact of the elastomeric seal member against the stopper member;

g. responsive means responsive only to differential pressure caused by the upstream fluid pressure after the sealing surface of the ring shaped seat is in contact with the stopper member and if there is occurrence of leakage of the primary seal for providing sealing engagement force of said elastomeric seal member against said stopper to form a bubble tight, secondary seal; and h. the responsive means includes means to provide engagement force commensurate with the upstream line pressure, whereby the secondary seal acts to maintain a sealing engagement with the stopper member if the primary seal should leak.

2. The ball valve of claim 1, comprising:

i. a second valve seat in the upstream recess around the inner end of the flow passage, the second seat comprising a second ring shaped seat having an inside portion aligned with the upstream flow passage and an outside portion and a sealing surface facing the stopper member and located between the inside portion and the outside portion between which the stopper member rotates between the open and closed position such that the stopper forms a primary bubble tight seal in response to upstream pressure acting on the second ring shaped seat when the stopper is in the valve closed position, whereby the primary seal acts to seal the fluid under pressure from upstream fluid pressure from flowing past the primary seal when the primary seal is formed.

3. The ball valve of claim 2, wherein there is a space between the primary seal and the secondary seal and there is means for testing the integrity of the primary seal and the secondary seal, including a passage communicating from the space between the primary and secondary seals to outside the valve body.

4. The ball valve of claim 2, wherein there is further included:

j. a second, secondary ring shaped seat member having an endface adjacent the stopper member slidably mounted around the outside portion of the second ring shaped seat, the second, secondary ring shaped seat member having an interior facing recess facing the valve chamber therearound at the endface of the second, secondary ring shaped seat member adjacent the stopper member;

k. a second elastomeric seal member disposed in the inner recess of the second, secondary ring shaped seat member;

l. a second spring member having selected spring value to provide initial contact of the second elastomeric seal member against the stopper member;

m. second responsive means responsive only to differential pressure caused by the upstream fluid pressure after the sealing surface of the second ring shaped seat is in contact with the stopper member and if there is occurrence of leakage of the primary seal for providing sealing engagement force of said second elastomeric seal member against said stopper member to form a bubble tight, secondary seal; and n. the second responsive means includes means to provide engagement force commensurate with the upstream line pressure, whereby the second, secondary seal acts to maintain a sealing engagement with the stopper member if the primary seal leaks.

5. The ball valve of claim 4, wherein there is a space between the primary seal and the secondary seal and there is means for testing the integrity of the primary seal and the secondary seal, including a passage communicating from the space between the primary and secondary seals to outside the valve body.

6. The ball valve of claim 1, wherein there is a space between the primary seal and the secondary seal and there is means for testing the integrity of the primary seal and the secondary seal, including a passage communicating from the space between the primary and secondary seals to outside the valve body.

* * * * *